(12) United States Patent
Mann

(10) Patent No.: US 7,735,849 B1
(45) Date of Patent: Jun. 15, 2010

(54) COMPACT FIFTH WHEEL LOCKING MECHANISM

(75) Inventor: Steven William Mann, Gardendale, AL (US)

(73) Assignee: Fontaine Fifth Wheel, Trussville, AL (US)

( * ) Notice: Subject to any disclaimer, the term of this patent is extended or adjusted under 35 U.S.C. 154(b) by 468 days.

(21) Appl. No.: 11/715,067

(22) Filed: Mar. 6, 2007

Related U.S. Application Data

(60) Provisional application No. 60/779,732, filed on Mar. 7, 2006.

(51) Int. Cl.
*B62D 53/08* (2006.01)

(52) U.S. Cl. .................. 280/433; 280/434; 280/435; 280/436

(58) Field of Classification Search .......... 280/433–436
See application file for complete search history.

(56) References Cited

U.S. PATENT DOCUMENTS

| | | | | |
|---|---|---|---|---|
| 3,251,610 | A | * 5/1966 | Chosy | 280/435 |
| 3,534,982 | A | * 10/1970 | De Land et al. | 280/435 |
| 3,630,545 | A | 12/1971 | Fontaine | |
| 3,844,584 | A | 10/1974 | Fontaine | |
| 4,208,062 | A | * 6/1980 | Maassen | 280/434 |
| 4,477,100 | A | * 10/1984 | Elyakim | 280/434 |
| 4,928,987 | A | * 5/1990 | Hunger | 280/435 |
| 5,257,796 | A | * 11/1993 | Thorwall et al. | 280/434 |
| 5,516,137 | A | 5/1996 | Kass et al. | |
| 5,641,174 | A | 6/1997 | Terry et al. | |
| 5,839,745 | A | 11/1998 | Cattau et al. | |
| 5,988,665 | A | 11/1999 | Terry et al. | |
| 6,352,277 | B1 | 3/2002 | Timmings | |
| 6,402,176 | B1 | 6/2002 | Timmings | |
| 6,467,793 | B2 | * 10/2002 | Putnam | 280/508 |
| 7,264,259 | B2 | * 9/2007 | Lindenman et al. | 280/438.1 |
| 7,384,056 | B2 | * 6/2008 | Anderson | 280/441 |

* cited by examiner

*Primary Examiner*—Lesley Morris
*Assistant Examiner*—Maurice Williams
(74) *Attorney, Agent, or Firm*—George P. Kobler; Lanier Ford Shave & Payne, P.C.

(57) ABSTRACT

In a fifth wheel hitch, a locking mechanism for retaining a trailer kingpin within a fifth wheel slot. The locking mechanism includes a jaw assembly comprised of two opposing jaw members pivotally attached at one end to the underside of the hitch plate, a longitudinally sliding cam interposed between the jaw members with a tip that contacts a bumper. The bumper is pivotally attached to tie bar that has its rear most end pivotally attached to the underside of the hitch plate. The mechanism also includes a wedge member and a secondary lock member pivotally attached thereto, where the lock member has a guide extension inserted through a guide hole in the tie bar. Rotation of the tie bar inward causes the wedge member and secondary lock to move inward until the wedge member is seated to the rear of the closed jaw assembly and the secondary lock rotates to engage a detent.

1 Claim, 4 Drawing Sheets

COMPACT FIFTH WHEEL LOCKING MECHANISM

CROSS-REFERENCE TO RELATED APPLICATIONS

This application claims priority of U.S. Provisional Application Ser. No. 60/779,732, filed Mar. 7, 2006, which is incorporated by reference herein.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to FIGS. 1 through 6 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," or "outward," or the like, and variations or derivatives thereof, are to be understand in relation to the vehicle on which the fifth wheel is mounted. On the other hand, rotational terms such as "clockwise" and "counter-clockwise" are to be understood as viewed in the figure(s) referenced in the detailed description. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

This invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1A:
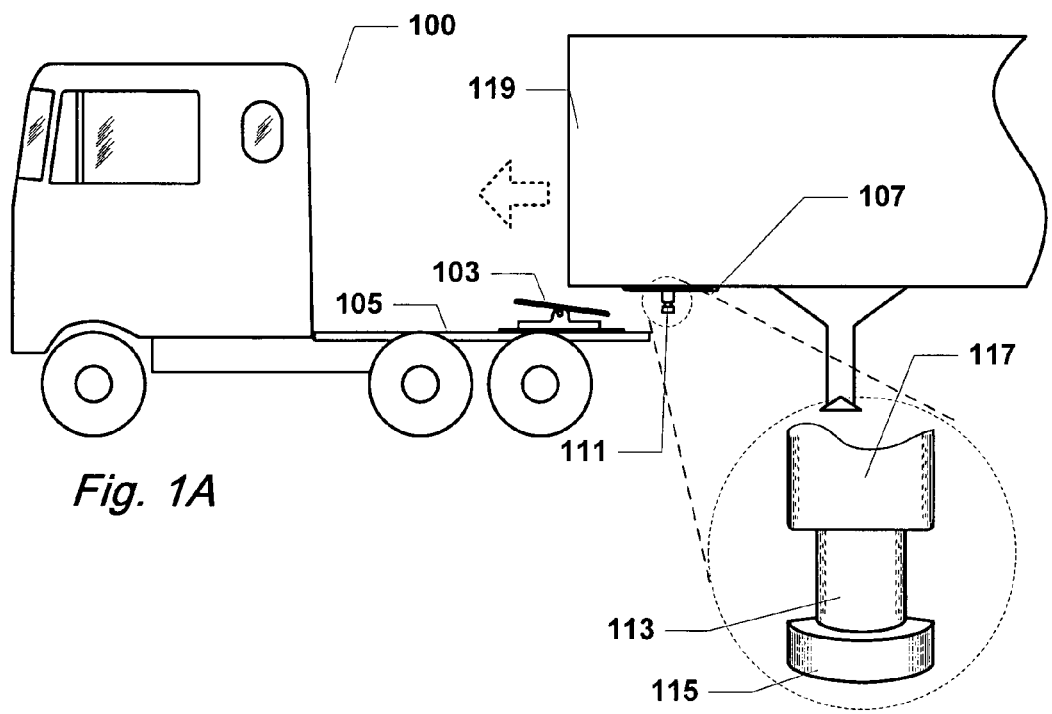
FIG. 1A is an exemplary tractor truck and trailer with a fifth wheel hitch.
Figure 1B:
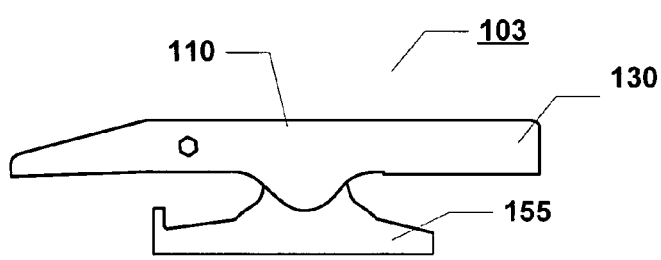
FIG. 1B is an exemplary fifth wheel hitch.
Figure 1C:
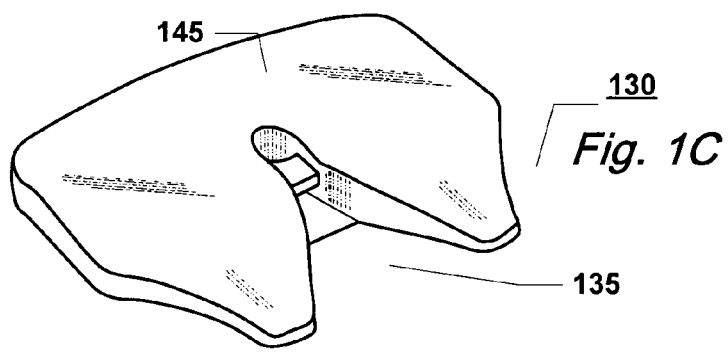
FIG. 1C is an exemplary hitch plate.

Fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 110 pivotally mounted on pedestal 155. Fifth wheel hitch assembly 110 comprises hitch plate 130 which houses a locking mechanism underneath (shown and described in greater detail below) with slot 135 opening toward the aft end of fifth wheel assembly 110 for receiving a kingpin 111 from trailer 119.

Kingpin 111 typically extends downward from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 2A:
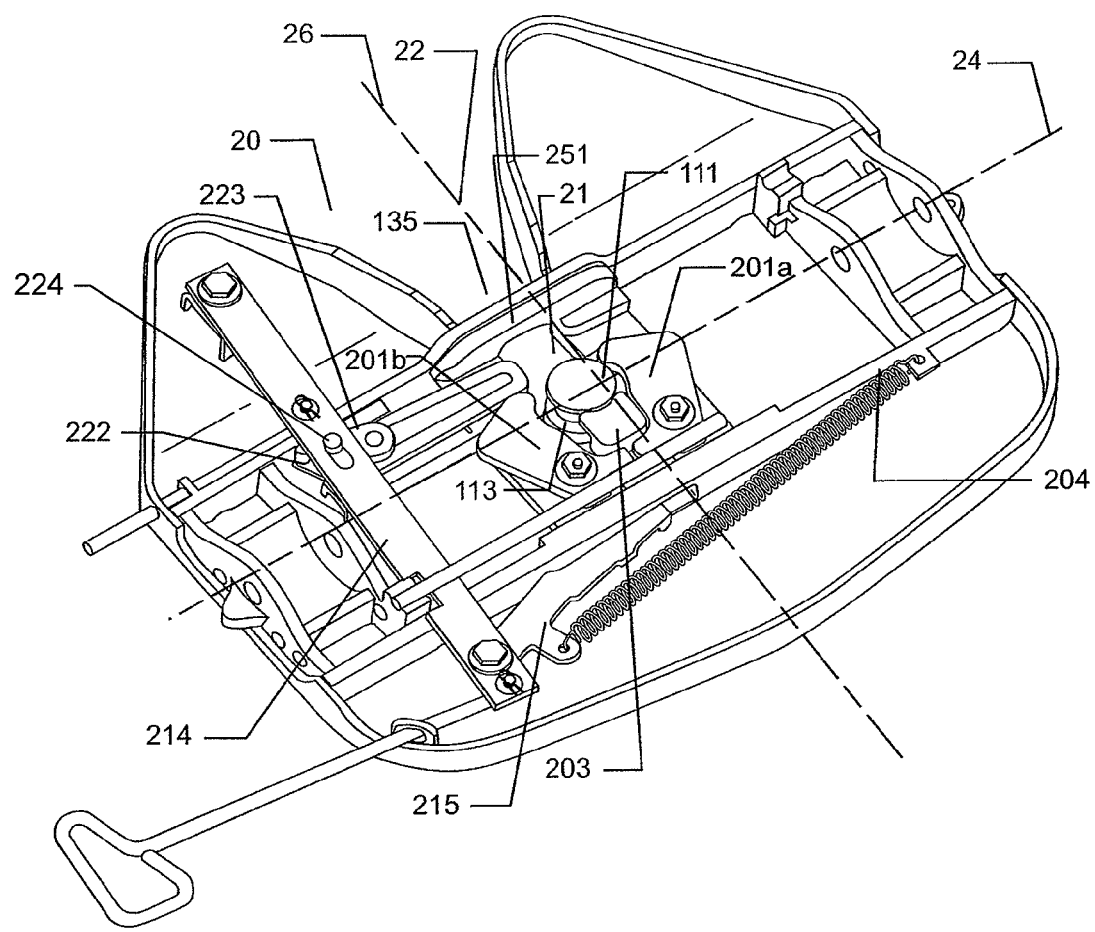
FIG. 2A is the underside of a hitch plate with an exemplary lock mechanism in the open position.
Figure 2B:
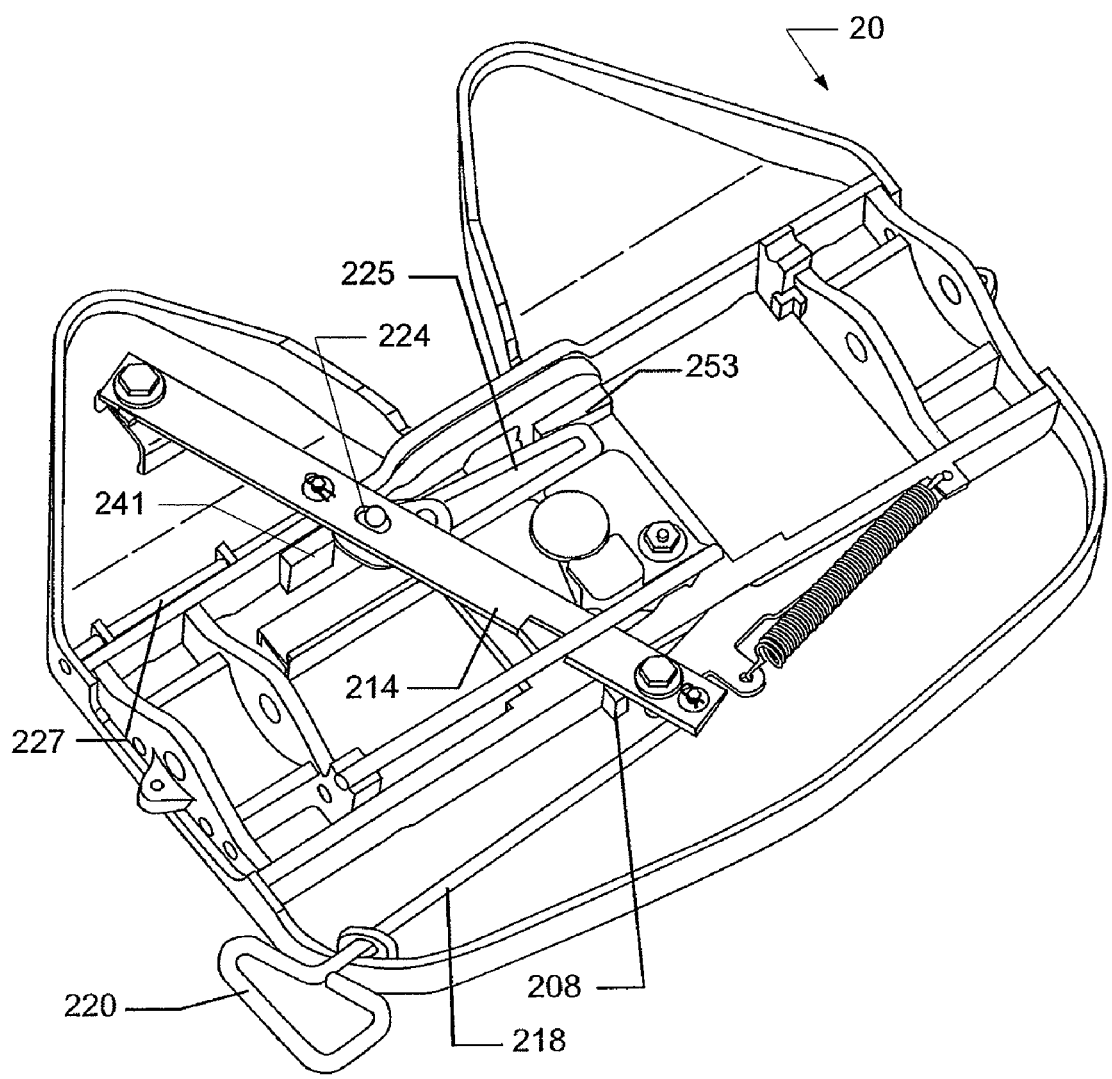
FIG. 2B is the underside of a hitch plate with an exemplary lock mechanism in the closed position.
Figure 3:
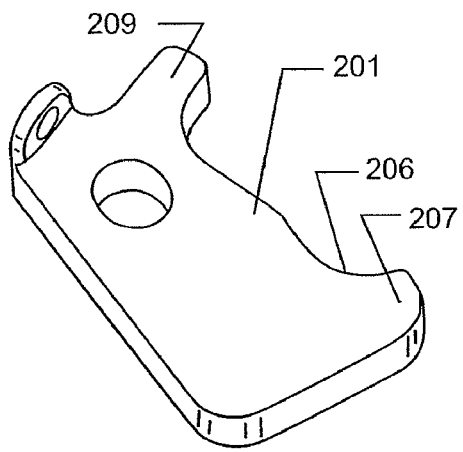
FIG. 3 is a detailed view of a jaw.
Figure 4:
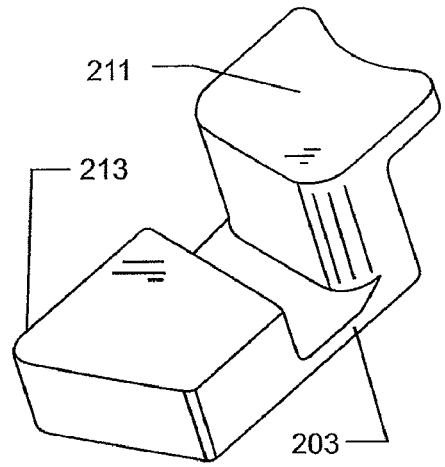
FIG. 4 is a detailed view of a sliding cam.
Figure 5:
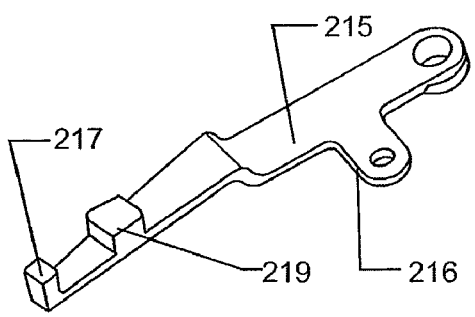
FIG. 5 is a detailed view of a bumper.
Figure 6:
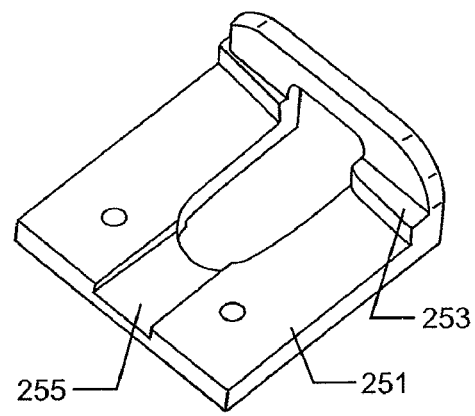
FIG. 6 is a detailed view of a yoke.

FIG. 2 depicts the underside of a fifth wheel hitch assembly referenced generally at 20, configured with a locking mechanism. The longitudinal axis of the fifth wheel hitch assembly is indicated at 22 and is understood to be parallel to the longitudinal axis of the truck upon which the fifth wheel is installed. The transverse axis is shown at 24. The hitch assembly aft end 26 includes a slot 135 to receive a trailer kingpin 111 and that opens to the rear of the truck. The fifth wheel includes a throat area 21 that is dimensioned to receive the kingpin shank portion 113.

The locking mechanism shown in FIG. 2 is in an open, unlocked condition. The locking mechanism includes a pair of opposing jaws 201a, b, (shown in detail in FIG. 3) each having a forward portion pivotally mounted to the underside of the fifth wheel plate with cam pins. Jaws 201a, b are configured with opposing recesses 206 on their inward edges that recess from inwardly extending portions 207 at the aft ends of the jaws 201a, b. Jaws 201a, b are also configured with opposing inward extending portions 209a, b at their respective forward ends. A sliding cam 203 (shown in FIG. 4) is mounted to the underside of the hitch plate just aft of the forward extending portions 209a, b of the jaws 201a, b. Sliding cam 203 includes a cap 211 with a rearward facing concave portion that is shaped to engage the lower flange 115 of the kingpin 111. Sliding cam 203 also includes a slightly laterally offset tip 213 seated substantially against the underside of the hitch plate. The hitch plate may have a forward frame member 204 for structural support. In this case, the forward frame member 204 should include an aperture for the cam tip 213 to be inserted through. A stop block 208 extends downward and forward from a point laterally displaced from the cam tip 213.

Bumper 215 (shown also in FIG. 5) is an elongated member disposed generally traversely on the underside of hitch plate having an innermost end extending far enough inward to be able to contact the cam tip as the cam 203 slides forward. Bumper 215 is configured with first finger 217 at its innermost end extending upward toward the underside of the hitch plate and a second finger 219 extending upward from an intermediate point along the bumper member 315 Bumper 215 also includes an attachment point 216 forwardly offset from the longitudinal axis of the bumper 215. The attachment point 216 anchors one end of a main tension spring 229 which extends transversely and somewhat aft of the attachment point with a second end that may be attached to the hitch plate support frame. The outward end of bumper 215 is pivotally coupled to a tie bar 214, which is oriented generally longitudinal with respect to the hitch plate, at a location near the tie bar's 214 forward end. Adjacent this coupling point between the bumper 215 and the tie bar 214 is an attachment point for a release rod 218 which extends through the outer lateral frame of the hitch plate, supported by a bearing in which an aperture is defined through which the rod extends. The release rod preferably terminates at its outer end with a pull handle 220.

Tie bar 214 is pivotally attached to the underside of the hitch plate at the tie bar's rearmost end. An indicator rod 227 is pivotally coupled to the tie bar 214 at a point forward of the rearmost end. The indicator rod 227 extends outwardly from the tie bar 214 through guide apertures in the hitch plate lateral outer frame such that when the lock mechanism is unlocked, the outward end of the rod is easily visible. Preferably, to make the rod more easily noticeable, the rod is of a bright color that would communicate to an observer an unsafe condition might exist.

Locking mechanism includes a secondary lock member 223 having a pivoting connection to the underside of wedge member 225. The secondary lock 223 is configured with an outward tip 222 directed generally aftward, and a guide extension 224 which is inserted into guide hole disposed in a middle portion of the tie bar 214. Together, secondary lock 223 and wedge 225 are in slidable contact with the aft most transverse support frame of the hitch plate. Interposed between the frame and the wedge and lock member combination is detent that extends forward from the frame, creating a space to the inward side of the detent.

The underside of the hitch plate is configured to include a yoke 251 surrounding the throat area interposed between the forward and tear transverse frame members. Yoke 251 (shown in detail in FIG. 6) serves as a base for which to attach clam shell jaws, and slidable cam. A counter-wedge 253 extends forward from the inner rear wall of the yoke 251 on the side of the throat opposing the wedge member 225 when the lock is in the full open position. Yoke 251 is configured with a channel 255 in which cam 203 is slidably fitted. Yoke 251 may be a separate piece attached to hitch plate by welding or the like, or it may be a unitary part of the hitch plate.

In operation, as the vehicle mounted with the fifth wheel is driven to mate with the trailer, the kingpin is received into throat area where the lower flange of the kingpin contacts the concave portion of cap of the sliding cam. The kingpin is moved to the forward end of the throat area it forces the sliding cam forward where it contacts the forward extensions of the opposing jaws causing them to counter-rotate with respect to each other. This brings the aft extensions to a closed position in behind the kingpin shank with the kingpin shank received with the two opposing recesses of the jaws.

The forward movement of sliding cam also causes the cam tip to engage and push the end of the bumper innermost end which rotates the in the clockwise direction as viewed in the Figures. In the fully open position, the bumper is engaged with the outer side bumper stop at the bumper's inward side of the second finger. This prevents the bumper, and thus, the tie bar, being drawn closed through the operation of the tension spring. As the bumper, then, is rotated the second finger is drawn clear of the bumper stop. This allows the bumper and tie bar to react to the pulling force of the tension spring, and move and rotate inwardly, respectively, drawing the lock release rod and the indicator rod inward as well.

The counter-clockwise rotation of the tie bar also draws the secondary lock and wedge member inward, where the wedge member engages the rear portion of the closed jaws. The wedge member is also forced against the counter-wedge on the inner rear portion of the yoke. This arrangement prevents the two jaws from opening and distributes the loads imparted through the kingpin to the hitch plate frame.

As the wedge member is drawn inward by the spring-driven rotation of the tie bar, so is the secondary lock, until its outward tip is clear of the detent. The tip is then forced into the space through the interaction of the guide extension with the guide hole. The guide hole is sized and oriented such that rotation of the tie bar forces the guide extension, and thus, the secondary lock aftward. With the outward tip in the space, it can engage the inner surface of the detent. This prevents the wedge from disengaging, and thus, helps to prevent uncommanded opening of the lock.

Opening lock and disengaging the kingpin from the jaws begins with a pull force imparted on the lock release rod. This rotates the tie bar clockwise drawing the forward end outward. Rotation of the tie bar results in angular movement of the guide hole through which the secondary lock guide extension is inserted. The configuration of the angularly moving guide hole operating upon the guide extension causes the secondary lock to rotate counter-clockwise bringing the tip free of the detent. This allows the secondary lock and the wedge member to be drawn outward disengaging the wedge from the jaws and counter-wedge. When the wedge member clears, the jaws are free to open and are biased to do so through a bias member, which may be a compression spring, or the like, insinuated between the forward extensions of the jaws. Finally, indicator rod is also pushed outward to become visible once again.

As described above and shown in the associated drawings, the present invention comprises a compact fifth wheel locking mechanism. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. In a fifth wheel hitch having a hitch plate with a rear opening throat area for receiving a trailer kingpin and front and rear transverse support frames, a locking mechanism for retaining said kingpin within said throat area comprising:

a. a jaw assembly for enclosing around the rear portion of said kingpin received within said throat area comprising:

i. a pair of opposing jaw members pivotally attached by their respective forward ends to the underside of said hitch plate, each said jaw member having a front inward extension, a rear inward extension and an inward recess within which a kingpin shank is received, said front inward extensions of said jaw members being biased toward each other;

ii. a sliding cam mounted to the underside of said hitch plate operable to slide forward and rearward, interposed between said jaw members, said sliding cam including a downward extension for transferring relative motion of kingpin to front jaw extensions, and a forward extending tip;
b. a tie bar pivotally attached at its rear most end to the underside of the hitch plate;
c. a wedge member slidably seated against the underside of the hitch plate having a narrow inward end interposed between the rear transverse frame of the hitch plate and the rear ends of said jaw members;
d. a bumper pivotally attached to the forward portion of said tie bar and generally transversely oriented with respect to the hitch plate, said bumper having an upward extension for engaging a bumper stop block jutting forward from the front transverse support frame and a forward extending attachment point;
e. a secondary lock member pivotally attached by its inward end to said wedge member, said secondary lock member having a guide extension seated within a guide aperture disposed within the mid-region of said tie bar, said secondary lock having an outward tip;
f. a counter-wedge extending forward from the rear frame of the hitch plate for communication of kingpin loads to the frame through interaction of said jaw assembly and said wedge member in abutment therewith;
g. a first tension member having a first end attached to said forward attachment point of said bumper and a second end attached to transverse portion of said hitch underside; and
h. a detent extending forward from the rear transverse frame creating a space abutting said rear frame; and
wherein rotation of said tie bar impels said wedge member and said secondary lock member inward until the tip is caused to be seated within said space seated against the inner wall of said detent by exertion of force upon said guide extension through angular movement of said guide hole.

* * * * *